United States Patent
Du et al.

(10) Patent No.: US 11,060,023 B2
(45) Date of Patent: Jul. 13, 2021

(54) COATED MANGANESE DOPED PHOSPHORS

(71) Applicant: Current Lighting Solutions, LLC, East Cleveland, OH (US)

(72) Inventors: Fangming Du, Hudson, OH (US); Clark David Nelson, Concord Township, OH (US); Sara Ann Krosschell, Euclid, OH (US)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 16/621,499

(22) PCT Filed: Aug. 9, 2018

(86) PCT No.: PCT/US2018/046129
§ 371 (c)(1),
(2) Date: Dec. 11, 2019

(87) PCT Pub. No.: WO2019/032909
PCT Pub. Date: Feb. 14, 2019

(65) Prior Publication Data
US 2020/0199446 A1  Jun. 25, 2020

Related U.S. Application Data

(63) Continuation of application No. 15/674,495, filed on Aug. 10, 2017, now abandoned.

(51) Int. Cl.
| | |
|---|---|
| *C09K 11/61* | (2006.01) |
| *C09K 11/66* | (2006.01) |
| *C09K 11/67* | (2006.01) |
| *C09K 11/02* | (2006.01) |
| *C09K 11/59* | (2006.01) |

(52) U.S. Cl.
CPC ............ *C09K 11/665* (2013.01); *C09K 11/02* (2013.01); *C09K 11/59* (2013.01); *C09K 11/675* (2013.01)

(58) Field of Classification Search
CPC ... C09K 11/616; C09K 11/617; C09K 11/675; C09K 11/628; C09K 11/645; C09K 11/665; C09K 11/0838; C09K 11/02; C09K 11/664; C09K 2211/181; C09K 2211/188; H01L 33/502; H01L 33/504; H01L 33/507; H01L 33/52; Y02B 20/181
USPC ...... 252/301.4 F, 301.4 H, 301.4 R, 301.6 F; 313/503, 486
See application file for complete search history.

(56) References Cited

U.S. PATENT DOCUMENTS

| | | | |
|---|---|---|---|
| 7,358,542 B2 | 4/2008 | Radkov et al. | |
| 7,497,973 B2 | 3/2009 | Radkov et al. | |
| 7,648,649 B2 | 1/2010 | Radkov et al. | |
| 8,057,706 B1 | 11/2011 | Setlur et al. | |
| 8,252,613 B1 | 8/2012 | Lyons et al. | |
| 8,491,816 B2 | 7/2013 | Hong et al. | |
| 8,710,487 B2 | 4/2014 | Lyons et al. | |
| 8,906,724 B2 | 12/2014 | Murphy et al. | |
| 9,512,356 B2 * | 12/2016 | Lyons ................... | C09K 11/617 |
| 10,920,136 B2 * | 2/2021 | Hanumantha ........ | C09K 11/616 |
| 2012/0256125 A1 | 10/2012 | Kaneyoshi et al. | |
| 2013/0241396 A1 | 9/2013 | Hiramatsu et al. | |
| 2015/0048399 A1 | 2/2015 | Weiler et al. | |
| 2015/0054400 A1 | 2/2015 | Murphy | |
| 2015/0361337 A1 * | 12/2015 | Murphy ............... | C09K 11/617 257/98 |
| 2016/0024378 A1 * | 1/2016 | Murphy ............... | C09K 11/617 362/84 |
| 2018/0312751 A1 * | 11/2018 | Hanumantha ........ | C09K 11/616 |

FOREIGN PATENT DOCUMENTS

| | | |
|---|---|---|
| CN | 102827601 A | 12/2012 |
| CN | 102851026 A | 1/2013 |
| WO | 2007064416 A1 | 6/2007 |
| WO | 2009012301 A2 | 1/2009 |
| WO | 2012015581 A1 | 2/2012 |

(Continued)

OTHER PUBLICATIONS

Hu et al., "Preparation and luminescent properties of (Ca1-x,Srx)S:Eu2+ red-emitting phosphor for white LED", Journal of Luminescence, ScienceDirect, Feb. 1, 2005,vol. 111, Issue 3, pp. 139-145.

Kasa et al.,"Red and Deep Red Emissions from Cubic K2SiF6:Mn4+ and Hexagonal K2MnF6 Synthesized in HF/ KMnO4/KHF2/Si Solutions", Journal of The Electrochemical Society, ECS, 2012, vol. 159, issue 4, pp. J89-J95.

Liao et al.,"Synthesis of K2SiF6:Mn4+ Phosphor from SiO2 Powders via Redox Reaction in HF/KMnO4 Solution and Their Application in Warm-White LED", Journal of the American Ceramic Society, Wiley online library, Nov. 2013, vol. 96, Issue 11, pp. 3552-3556.

PCT Search Report and Written Opinion issued in connection with corresponding Application No. PCT/US2015/41102 dated Oct. 8, 2015, 12 pages.

(Continued)

*Primary Examiner* — Matthew E. Hoban
*Assistant Examiner* — Lynne Edmondson
(74) *Attorney, Agent, or Firm* — Buckley, Maschoff & Talwalkar LLC

(57) ABSTRACT

A process for preparing a population of coated phosphor particles is presented. The process includes combining particles of a phosphor of formula I: $A_x[MF_y]$:$Mn^{4+}$ with a first solution including a compound of formula II: $A_x[MF_y]$ to form a suspension, where A is Li, Na, K, Rb, Cs, or a combination thereof; M is Si, Ge, Sn, Ti, Zr, Al, Ga, In, Sc, Hf, Y, La, Nb, Ta, Bi, Gd, or a combination thereof; x is an absolute value of a charge of the $[MF_y]$ ion; and y is 5, 6 or 7. The process further includes combining a second solution including a source $A^+$ ions with the suspension.

12 Claims, 1 Drawing Sheet

(56) References Cited

FOREIGN PATENT DOCUMENTS

Figure 1:
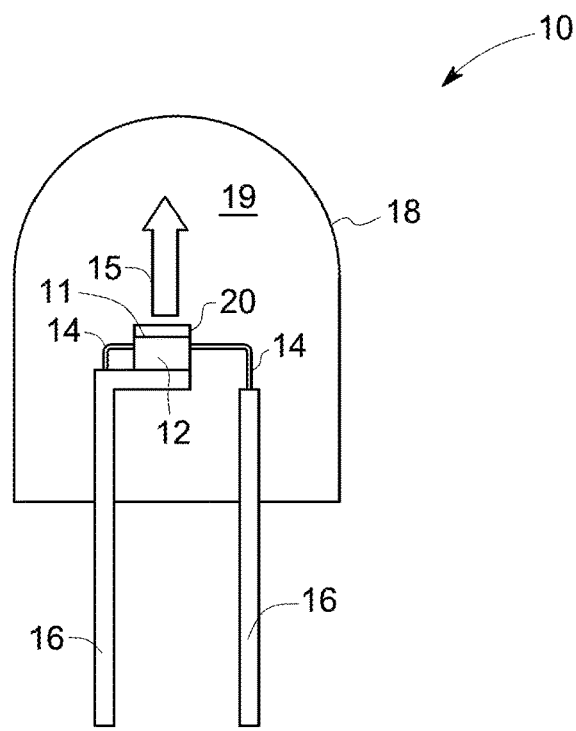

WO    2013121355 A1    8/2013
WO    2015129741 A1    9/2015

OTHER PUBLICATIONS

Porob et al.,"Coated Red Line Emitting Phosphors"Pending IN Patent Application Sr. No. 1201641039267; Filing Date:Nov. 17, 2016, GE Docket No. 313629-1; 35 Pages.
International Search Report and Written Opinion issued in connection with corresponding PCT Application No. PCT/US2018/046129 dated Jan. 23, 2019.
Sijbom, F.h., et al., "Luminescent Behavior of the $K_2SiF_6:Mn^{4+}$ Red Phosphor at High Fluxes and at the Microscopic Level," ECS Journal of Solid State Science and Technology, vol. 5, No. 1, pp. R3040-R3048 (2016).
Korean Office Action dated Apr. 22, 2021 which was issued in a counterpart application KR10-2020-7005699 which was filed on Aug. 9, 2018.

* cited by examiner

COATED MANGANESE DOPED PHOSPHORS

BACKGROUND

Red-emitting phosphors based on complex fluoride materials activated by manganese ($Mn^{4+}$), such as those described in U.S. Pat. Nos. 7,358,542, 7,497,973, and 7,648,649, can be utilized in combination with yellow/green emitting phosphors such as YAG:Ce or other garnet compositions to achieve warm white light (CCTs<5000 K on the blackbody locus, color rendering index (CRI>80) from a blue LED, equivalent to that produced by current fluorescent, incandescent and halogen lamps. These materials absorb blue light strongly and efficiently emit between about 610-635 nanometers (nm) with little deep red/NIR emission. Therefore, luminous efficacy is maximized compared to red phosphors that have significant emission in the deeper red where eye sensitivity is poor. Quantum efficiency can exceed to 85% under blue (440-460 nm) excitation.

While the efficacy and CRI of lighting systems using manganese doped red-emitting phosphors can be quite high, the potential limitations may be color instability and non-uniformity due to their susceptibility to degradation under high temperature and/or high humidity conditions. It may be possible to reduce the color instability issue of the manganese doped red-emitting phosphors using post-synthesis processing steps as described in U.S. Pat. No. 8,906,724. However, development of manganese doped red-emitting phosphors with improved stability is desirable.

BRIEF DESCRIPTION

One aspect of the specification presents a process for preparing a population of coated phosphor particles. The process includes combining particles of a phosphor of formula I: $A_x[MF_y]$:$Mn^{4+}$ with a first solution including a compound of formula II: $A_x[MF_y]$ to form a suspension, where A is Li, Na, K, Rb, Cs, or a combination thereof, M is Si, Ge, Sn, Ti, Zr, Al, Ga, In, Sc, Hf, Y, La, Nb, Ta, Bi, Gd, or a combination thereof; x is an absolute value of a charge of the $[MF_y]$ ion; and y is 5, 6 or 7. The process further includes combining a second solution including a source $A^+$ ions with the suspension.

In one aspect of the specification, a process for preparing a population of coated phosphor particles includes combining particles of $K_2[SiF_6]$:$Mn^{4+}$ with a first solution including $K_2[SiF_6]$ to form a suspension and combining a second solution including KF with the suspension.

DRAWINGS

Figure 2:
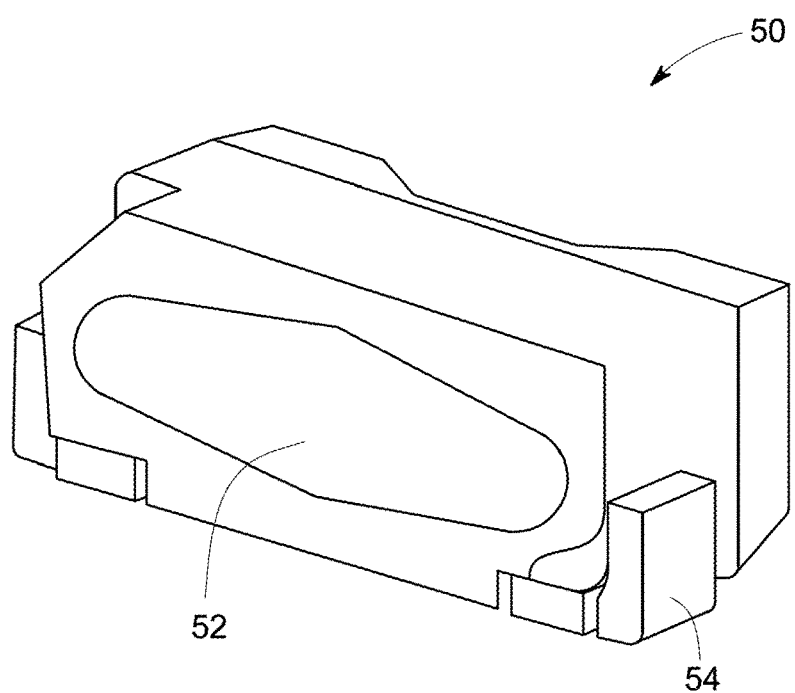

These and other features, aspects, and advantages of the present disclosure will become better understood when the following detailed description is read with reference to the accompanying drawings, wherein:

FIG. 1 is a schematic cross-sectional view of a lighting apparatus, in accordance with one embodiment of the present disclosure; and FIG. 2 is a schematic view of a surface-mounted device (SMD), in accordance with one embodiment of the present disclosure.

DETAILED DESCRIPTION

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

The terms "first", "second", and the like, as used herein do not denote any order, quantity, or importance, but rather are used to distinguish one element from another.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, or 20 to 80, it is intended that values such as 15 to 85, 22 to 68, 43 to 51, 30 to 32 etc. are expressly enumerated in this specification. For values, which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Some embodiments provide a process for preparing a population of coated phosphor particles. The process includes combining particles of a phosphor of formula I: $A_x[MF_y]$:$Mn^{4+}$ with a first solution including a compound of formula II: $A_x[MF_y]$ to form a suspension and combining a second solution including a source of $A^+$ ions to the suspension. In some embodiments, the process may result the population of coated phosphor particles having a core including the phosphor of formula I and a coating disposed on the core. The coating may include the compound of formula II.

Both, the phosphor of formula I and the compound of formula II, are complex fluorides. Complex fluorides have a host lattice containing one coordination center surrounded by fluoride ions acting as ligands, and charge-compensated by counter ions (A) as required. For example, in $K_2[SiF_6]$, the coordination center is Si and the counter ion is K. Complex fluorides are generally represented as a combination of simple, binary fluorides. The square brackets in the chemical formula for the complex fluorides (occasionally omitted for simplicity) indicate that the complex ion present in that particular complex fluoride is a new chemical species, different from the simple fluoride ion.

The phosphor of formula I is a manganese ($Mn^{4+}$) doped complex fluoride. The phosphor of formula I is a phosphor that emits red light, and may also be referred to as 'red-emitting' phosphor, and these terms are used interchangeably throughout the specification. In the phosphor of formula I, the $Mn^{4+}$ dopant or activator acts as an additional coordination center, substituting a part of the coordination center, for example, Si, forming a luminescent center. The manganese doped phosphor of formula I: $A_2[MF_6]$:$Mn^{4+}$ may also be represented as $A_2[(M, Mn)F_6]$. The host lattice (including the counter ions) may further modify the excitation and emission properties of the activator ion.

The counter ion A in formula I and formula II, is Li, Na, K, Rb, Cs, or a combination thereof. In certain embodiments, A is Na, K, or a combination thereof. The coordination center M is Si, Ge, Ti, Zr, Hf, Sn, Al, Ga, In, Sc, Y, Bi, La, Gd, Nb, Ta, or a combination thereof. In some embodiments, M is Si, Ge, Ti, or a combination thereof. In certain embodiments, A is K, and M is Si.

Suitable examples of the compound of formula II include $K_2[SiF_6]$, $K_2[TiF_6]$, $K_2[SnF_6]$, $Cs_2[TiF_6]$, $Rb_2[TiF_6]$, $Cs_2[SiF_6]$, $Rb_2[SiF_6]$, $Na_2[TiF_6]$, $Na_2[ZrF_6]$, $K_3[ZrF_7]$, $K_3[BiF_7]$, $K_3[YF_7]$, $K_3[LaF_7]$, $K_3[GdF_7]$, $K_3[NbF_7]$ and $K_3[TaF_7]$. In certain embodiments, the compound of formula II is $K_2SiF_6$.

Suitable examples of the phosphor of formula I include $K_2[SiF_6]:Mn^{4+}$, $K_2[TiF_6]:Mn^{4+}$, $K_2[SnF_6]:Mn^{4+}$, $Cs_2[TiF_6]:Mn^{4+}$, $Rb_2[TiF_6]:Mn^{4+}$, $Cs_2[SiF_6]:Mn^{4+}$, $Rb_2[SiF_6]:Mn^{4+}$, $Na_2[TiF_6]:Mn^{4+}$, $Na_2[ZrF_6]:Mn^{4+}$, $K_3[ZrF_7]:Mn^{4+}$, $K_3[BiF_7]:Mn^{4+}$, $K_3[YF_7]:Mn^{4+}$, $K_3[LaF_7]:Mn^{4+}$, $K_3[GdF_7]:Mn^{4+}$, $K_3[NbF_7]:Mn^{4+}$ or $K_3[TaF_7]:Mn^{4+}$. In certain embodiments, the phosphor of formula I is $K_2SiF_6:Mn^{4+}$.

The amount of manganese in the phosphor of formula I may range from about 0.1 weight percent (wt %) to about 4 wt %, (from about 1.2 mole percent (mol %) to about 16.5 mol %), based on a total weight of the phosphor of formula I. In some embodiments, the amount of manganese ranges from about 0.3 wt % to about 3.3 wt % (from about 2 mol % to about 13.4 mol %), and in certain embodiments, from about 0.65 wt % to about 3.0 wt % (from about 2.6 mol % to about 12.2 mol %). In some embodiments, the amount of manganese ranges from about 0.5 wt % to about 2.76 wt % (about 3 mol % to about 11.2 mol %). In some embodiments, the amount of manganese ranges from about 0.9 wt % to about 2.5 wt % (from about 3.5 mol % to about 10 mol %), and in certain embodiments, from about 0.9 wt % to about 1.4 wt % (about 3.5 mol % to about 5.5 mol %).

In some embodiments, the particles of the phosphor of formula I are treated to enhance performance and stability (quantum efficiency, thermal stability, humidity stability, flux stability, and color stability) prior to the step of combining the phosphor of formula I with the first solution. In one embodiment, the particles of the phosphor of formula I are contacted with a fluorine-containing oxidizing agent in gaseous form at an elevated temperature. The treatment process is described in U.S. Pat. No. 8,906,724.

In some embodiments, the first solution includes a solution of the compound of formula II in aqueous hydrofluoric acid. In some instances, the process includes forming the first solution by dissolving the compound of formula II in aqueous hydrofluoric acid. In some embodiments, the first solution is a saturated solution of the compound of formula II in aqueous hydrofluoric acid. In some embodiments, the first solution is a nearly-saturated solution of the compound of formula II in aqueous hydrofluoric acid. A nearly-saturated solution is one that contains 1-10% solvent in excess of the amount required to make a saturated solution. In one example, a nearly-saturated solution is composed of $K_2SiF_6$ dissolved in aqueous HF. A saturated solution is prepared by adding $K_2SiF_6$ to the aqueous HF to form a suspension and filtering to remove excess solids. Then approximately 1-5 vol % aqueous HF is added to the saturated solution, to form a nearly saturated solution.

In some embodiments, the second solution includes a solution of the source of A ions in aqueous hydrofluoric acid. The source of $A^+$ ions may include an organic or inorganic compound. The source of $A^+$ ions may be a compound selected from a halide, sulphate, phosphate, acetate, and combinations thereof. In some embodiments, the source of $A^+$ ions includes KF, $KHF_2$, KCl, KBr, KI, $K_2SO_4$, $K_3PO_4$, $CH_3COOK$, or a combination thereof. In some embodiments, the process includes forming the second solution by dissolving an amount of the source of $A^+$ ions in aqueous hydrofluoric acid. In certain embodiments, the second solution includes KF.

A concentration of aqueous hydrofluoric acid used in the first solution, the second solution or both the first solution and the second solution may range from about 20 weight percent (wt %) to about 70 wt %. In some embodiments, the first solution, the second solution or both include aqueous hydrofluoric acid having a concentration in a range from about 30 wt % to about 60 wt %. A small quantity of other acids may be included in the first, second or both solutions if desired, such as hexafluorosilicic acid.

The amounts of the constituents i.e., the compound of formula II and the source of $A^+$ ions in the corresponding first and second solutions may be suitable for carrying out the desirable chemical reaction, and thereby forming a desirable coating on the particles of the phosphor of formula I. In some embodiments, a molar ratio of the source of $A^+$ ions in the second solution to the compound of formula II in the first solution is in a range from about 1:1 to about 1:20. In some embodiments, the molar ratio of the source of $A^+$ ions in the second solution to the compound of formula II in the first solution is in a range from about 1:2 to about 1:10.

The step of combining the second solution with the suspension may be carried out with a suitable rate for a desirable result. In some embodiments, the combining step is carried out by combining the second solution with the suspension with a rate of less than 100 milliliters/minute. In some embodiments, the rate of combining the second solution with the suspension is in a range from about 0.1 milliliter/minute to about 10 milliliters/minute.

On combining the second solution with the suspension, the compound of formula II precipitates out. Without being bound by any theory, it is believed that the presence of the source of $A^+$ ions in the suspension may help in precipitating out the compound of formula II in the suspension due to the common ion effect. As the chemical reaction proceeds, the process may include disposing the precipitate on the surfaces of the particles of the phosphor of formula I, and thereby forming a coating on the particles. In some embodiments, the coating includes the compound of formula II. In some embodiments, the coating is free of manganese. As used herein, the term "free of manganese" means that the manganese concentration on the surfaces of the particles is less than 0.1 wt %. In some embodiments, the combining step may be carried out at an elevated temperature, for example up to about 100 degrees Celsius. In certain embodiments, the combining step is carried out at room temperature (~25 degrees Celsius).

In some embodiments, during the step of combining the second solution with the suspension, the suspension is subjected to an agitated motion. In some instances, the agiated motion refers to stirring of the suspension. In some embodiments, the process includes continuously subjecting the suspension to the agitated motion for the entire step of combining the second solution with the suspension. The agitated motion may enable to dispose the formed precipitate on substantially all the particles of the phosphor of formula I to form a coating, and thereby form the population of coated particles.

The process may further include filtering the suspension after completing the step of combining the second solution with the suspension to obtain the product particles. The process may further include washing the product particles followed by drying to obtain the population of coated phosphor particles. In some embodiments, the population of coated phosphor particles is obtained in powder form.

The thickness of the coating may depend on various process parameters, for example, one or more of the amounts of the constituents of the first solution and the second solution and the rate of combining the second solution with the suspension, and may be controlled by tailoring these parameters.

The population of coated phosphor particles may have a particle size distribution having a D50 particle size in a range from about 0.1 micron to about 80 microns. In some embodiments, the coated phosphor particles have a particle size distribution having a D50 particle size in a range from about 1 micron to about 50 microns. In some embodiments, a D50 particle size of the coated phosphor particles is sub-micron size.

In some embodiments, a process for preparing a population of coated phosphor particles includes combining particles of $K_2SiF_6:Mn^{4+}$ with a first solution including $K_2SiF_6$ to form a suspension and combining a second solution including KF with the suspension. The first solution may include a nearly-saturated solution of $K_2SiF_6$ in aqueous hydrofluoric acid. The second solution may include solution of KF in aqueous hydrofluoric acid.

The coating may protect the particles of phosphor of formula I from degradation. The coated phosphor particles have a stability higher than that of the particles of the phosphor of formula I (i.e., uncoated particles). Stability of phosphor particles (coated or uncoated) may refer to stability of the phosphor particles in a high temperature and high humidity environment. Generally, stability of a phosphor material may be analyzed by measuring a change in quantum efficiency of the phosphor material after exposing the phosphor material to the high temperature and high humidity environment. As used herein, the term "high temperature and high humidity environment (HTHH)" refers to an environment having at least 50 percent relative humidity (with respect to an environment having no humidity) and at least 50 degrees' Celsius temperature. In some embodiments, the HTHH environment has at least 60 percent relative humidity and 60 degrees' Celsius temperature. In some embodiments, the HTHH environment has at least 80 percent relative humidity and 80 degrees' Celsius temperature. In some embodiments, the HTHH environment has about 90 percent relative humidity and 60 degrees' Celsius temperature. In some embodiments, a change in quantum efficiencies after exposing the coated phosphor particles is lower than that of a change in quantum efficiencies of the particles (uncoated) of the phosphor. The coated phosphor particles may have a stability higher than the stability of particles of the phosphor of formula I in the high temperature and high humidity environment.

Some embodiments are directed to a lighting apparatus that includes the population of coated phosphor particles prepared by the process described herein. FIG. 1 illustrates a lighting apparatus or lamp 10, in accordance with some embodiments. The lighting apparatus 10 includes a light emitting diode (LED) chip 12, and leads 14 electrically attached to the LED chip 12. The leads 14 may comprise thin wires supported by a thicker lead frame(s) 16 or the leads 14 may comprise self supported electrodes and the lead frame may be omitted. The leads 14 provide current to LED chip 12 and thus cause it to emit radiation. The LED chip 12 may be based on a semiconductor, for example a semiconductor of formula $In_iGa_jAl_kN$ (where $0 \leq i$; $0 \leq j$; $0 \leq k$ and $i+j+k=1$) having an emission wavelength greater than about 250 nanometers and less than about 550 nanometers. In certain embodiments, the LED chip 12 may be a blue emitting LED chip having a peak emission wavelength from about 400 nanometers to about 500 nanometers. In the lighting apparatus 10, a phosphor composition 20 including a population of coated phosphor particles (prepared by the process described herein above in some embodiments) is disposed on a surface 11 of the LED chip 12, and is radiationally coupled to the LED chip 12. The phosphor composition 20 can be deposited on the surface 11 of the LED chip 12 by any appropriate method, for example using a slurry prepared mixing silicone and the population of the coated phosphor particles. The light emitted by the LED chip 12 mixes with the light emitted by the population of coated phosphor particles to produce desired emission (indicated by arrow 15).

Although the general discussion of the example structure of the lighting apparatus discussed herein is directed toward inorganic LED based light sources, it should be understood that the LED chip may be replaced by an organic light emissive structure or other radiation source, unless otherwise noted, and that any reference to an LED chip or semiconductor is merely representative of any appropriate radiation source.

With continued reference to FIG. 1, the LED chip 12 may be encapsulated within an envelope 18, which encloses the LED chip 12 and an encapsulant material (not shown in FIG. 1) disposed in a portion 19 of the lighting apparatus 10. The envelope 18 may be formed of, for example, glass or plastic. The LED chip 12 may be enclosed by the encapsulant material. The encapsulant material may be a low temperature glass, or a polymer or resin known in the art, for example, an epoxy, silicone, epoxy-silicone, acrylate or a combination thereof. In an alternative embodiment, the lighting apparatus 10 may only include the encapsulant material without the envelope 18.

In some embodiments, a population of the coated phosphor particles may be interspersed within the encapsulant material, instead of being disposed on the LED chip 12 (referring to FIG. 1). In some other embodiments, the phosphor composition that includes the coated phosphor particles, may be coated onto a surface of the envelope 18, instead of being disposed on the LED chip 12. Moreover, in some embodiments, the lighting apparatus 10 may include a plurality of LED chips (not shown in figures). These various configurations may be combined, with the phosphor composition located in any two or more locations or in any other suitable location, such as separately from the envelop 18 or integrated into the LED chip 12. Further, one or more additional luminescent materials (described below) such as phosphors or mixtures of phosphors or other materials, may be used in the phosphor composition or different parts of the lighting apparatus 10, for example disposed on or below or in the phosphor composition 20 (FIG. 1) or any other location in the lighting apparatus 10.

The lighting apparatus 10 may also include a plurality of particles (not shown) to scatter or diffuse the emitted light. These scattering particles would generally be embedded in the encapsulant material. The scattering particles may include, for example, particles made from $Al_2O_3$ (alumina) or $TiO_2$ (titania). The scattering particles may effectively scatter the light emitted from the LED chip 12, preferably with a negligible amount of absorption.

Some embodiments include a backlight apparatus that includes a surface mounted device (SMD) type light emitting diode 50, e.g. as illustrated in FIG. 2. This SMD is a "side-emitting type" and has a light-emitting window 52 on a protruding portion of a light guiding member 54. An SMD package may comprise an LED chip as defined above, and a phosphor composition including a population of coated phosphor particles as described above.

By use of the phosphor compositions described herein in some embodiments, lighting apparatus can be provided producing red light or white light having high luminosity, and high CRI values for a low range of color temperatures of interest (2500 K to 4000 K) for general illumination.

peak wavelength (550-615 nm). This blend can yield a combination of high lumen equivalent and CRI greater than 95 and R9 greater than 95. In particular embodiments, the phosphor blend includes $K_2SiF_6:Mn^{4+}$ (PFS), along with $(Y,Gd,Tb,La,Sm,Pr,Lu)_3(Al,Ga)_{5-a}O_{12-3/2a}:Ce^{3+}$ (wherein $0 \leq a \leq 0.5$), particularly $Y_3Al_5O_{12}:Ce^{3+}$ (YAG), and $Li_2CaSiO_4:Eu^{2+}$. Spectral weight of each of the phosphors in the blend ranges from about 0.01 to 0.7. The blend calculations and corresponding luminosity, CRI and R9 values for three different CCT values of 3000K, 3500K and 4000K are shown in Table 1.

TABLE 1

|  | Blue LED (450 nm) | $Li_2CaSiO_4:Eu^{2+}$ | YAG | PFS | CRI | R9 | Luminosity (L/W · rad) |
|---|---|---|---|---|---|---|---|
| CCT = 3000K | 0.088667 | 0 | 0.554394108 | 0.35694 | 89 | 94 | 321 |
|  | 0.049055 | 0.07640022 | 0.51064533 | 0.3639 | 98 | 99 | 310 |
| CCT = 3500 | 0.112789 | 0 | 0.610680601 | 0.27653 | 85 | 88 | 328 |
|  | 0.057401 | 0.11493421 | 0.531670765 | 0.29599 | 98 | 99 | 308 |
| CCT = 4000K | 0.133624 | 0 | 0.651260525 | 0.21512 | 81 | 82 | 332 |
|  | 0.069294 | 0.1447656 | 0.539223658 | 0.24672 | 98 | 99 | 304 |

Additional luminescent materials capable of emitting green, blue, yellow, red, orange, or other color radiation may be used in the phosphor composition (for example, a blend) or the lighting apparatus to customize the white color of the resulting light and produce specific spectral power distributions. In some embodiments, the additional luminescent material emits green radiation.

Suitable additional phosphors for use in the phosphor composition include, but are not limited to:
$((Sr_{1-z}(Ca, Ba, Mg, Zn)_z)_{1-(x+w)}(Li, Na, K, Rb)_wCe_x)_3(Al_{1-y}Si_y)O_{4+y+3(x-w)}F_{1-y-3(x-w)}$, $0 \leq x \leq 0.10$, $0 \leq y \leq 0.5$, $0 \leq z \leq 0.5$, $0 \leq w \leq x$; $(Ca, Ce)_3Sc_2Si_3O_{12}$ (CaSiG); $(Sr,Ca,Ba)_3Al_{1-x}Si_xO_{4+x}F_{1-x}:Ce^{3+}$ (SASOF)); $(Ba, Sr,Ca)_5(PO_4)_3(Cl,F,Br,OH):Eu^{2+},Mn^{2+}$; $(Ba, Sr,Ca)BPO_5:Eu^{2+},Mn^{2+}$; $(Sr,Ca)_{10}(PO_4)_6 \cdot \Box B_2O_3:Eu^{2+}$ (wherein $0 < \Box \leq 1$); $Sr_2Si_3O_8 \cdot 2SrCl_2:Eu^{2+}$; $(Ca,Sr,Ba)_3MgSi_2O_8:Eu^{2+},Mn^{2+}$; $BaAl_8O_{13}:Eu^{2+}$; $2SrO \cdot 0.84P_2O_5 \cdot 0.16B_2O_3:Eu^{2+}$; $(Ba, Sr,Ca)MgAl_{10}O_{17}:Eu^{2+},Mn^{2+}$; $(Ba,Sr,Ca)Al_2O_4:Eu^{2+}$; $(Y,Gd,Lu,Sc,La)BO_3:Ce^{3+},Tb^{3+}$; $ZnS:Cu^+,Cl^-$; $ZnS:Cu^+,Al^{3+}$; $ZnS:Ag^+,Cl^-$; $ZnS:Ag^+,Al^{3+}$; $(Ba,Sr,Ca)_2Si_{1-n}O_{4-2n}:Eu^{2+}$ (wherein $0 \leq n \leq 0.2$); $(Ba, Sr,Ca)_2(Mg,Zn)Si_2O_7:Eu^{2+}$; $(Sr,Ca,Ba)(Al,Ga,In)_2S_4:Eu^{2+}$; $(Y,Gd,Tb,La,Sm,Pr,Lu)_3(Al,Ga)_{5-a}O_{12-3/2a}:Ce^{3+}$ (wherein $0 \leq a \leq 0.5$); $(Ca, Sr)_8(Mg,Zn)(SiO_4)_4Cl_2:Eu^{2+},Mn^{2+}$; $Na_2Gd_2B_2O_7:Ce^{3+},Tb^{3+}$; $(Sr,Ca,Ba,Mg,Zn)_2P_2O_7:Eu^{2+},Mn^{2+}$; $(Gd,Y,Lu,La)_2O_3:Eu^{3+},Bi^{3+}$; $(Gd,Y,Lu,La)_2O_2S:Eu^{3+},Bi^{3+}$; $(Gd,Y,Lu,La)VO_4:Eu^{3+},Bi^{3+}$; $(Ca,Sr)S:Eu^{2+},Ce^{3+}$; $SrY_2S_4:Eu^{2+}$; $CaLa_2S_4:Ce^{3+}$; $(Ba, Sr, Ca)MgP_2O_7:Eu^{2+},Mn^{2+}$; $(Y,Lu)_2WO_6:Eu^{3+},Mo^{6+}$; $(Ba, Sr, Ca)_bSi_gN_m:Eu^{2+}$ (wherein $2b+4g=3m$); $Ca_3(SiO_4)Cl_2:Eu^{2+}$; $(Lu,Sc,Y,Tb)_{2-u-v}Ce_vCa_{1+u}Li_wMg_{2-w}P_w(Si,Ge)_{3-w}O_{12-u/2}$ (where $-0.5 \leq u \leq 1$, $0 < v \leq 0.1$, and $0 \leq w \leq 0.2$); $(Y,Lu,Gd)_{2-m}(Y,Lu,Gd)Ca_mSi_4N_{6+m}C_{1-m}:Ce^{3+}$, (wherein $0 \leq m \leq 0.5$); (Lu,Ca,Li,Mg,Y), α-SiAlON doped with $Eu^{2+}$ and/or $Ce^{3+}$; $(Ca,Sr,Ba)SiO_2N_2:Eu^{2+},Ce^{3+}$; β-SiAlON:$Eu^{2+}$, $3.5MgO \cdot 0.5MgF_2 \cdot GeO_2:Mn^{4+}$; $Ca_{1-c-f}Ce_cEu_fAl_{1+c}Si_{1-c}N_3$, (where $0 \leq c \leq 0.2$, $0 \leq f \leq 0.2$); $Ca_{1-h-r}Ce_hEu_rAl_{1-h}(Mg,Zn)_hSiN_3$, (where $0 \leq h \leq 0.2$, $0 \leq r \leq 0.2$); $Ca_{1-2s-t}Ce_s(Li,Na)_sEu_tAlSiN_3$, (where $0 \leq s \leq 0.2$, $0 \leq t \leq 0.2$, $s+t>0$); $(Sr, Ca)AlSiN_3:Eu^{2+},Ce^{3+}$, and $Li_2CaSiO_4:Eu^{2+}$.

In some embodiments, the phosphor composition includes a blend of compound of formula I with a narrow blue-green phosphor with peak wavelength ranging from (475-510 nm, FWHM 30 nm or below) and a yellow-orange phosphor with Other additional materials suitable for use in phosphor composition include electroluminescent polymers such as polyfluorenes, preferably poly(9,9-dioctyl fluorene) and copolymers thereof, such as poly(9,9'-dioctylfluorene-co-bis-N,N'-(4-butylphenyl)diphenylamine) (F8-TFB); poly (vinylcarbazole) and polyphenylenevinylene and their derivatives. In addition, the phosphor composition may include a blue, yellow, orange, green or red phosphorescent dye or metal complex, or combinations thereof. Materials suitable for use as the phosphorescent dye include, but are not limited to, tris(1-phenylisoquinoline) iridium (III) (red dye), tris(2-phenylpyridine) iridium (green dye) and Iridium (III) bis(2-(4,6-difluorephenyl)pyridinato-N, C2) (blue dye). Commercially available fluorescent and phosphorescent metal complexes from ADS (American Dyes Source, Inc.) may also be used. ADS green dyes include ADS060GE, ADS061GE, ADS063GE, and ADS066GE, ADS078GE, and ADS090GE. ADS blue dyes include ADS064BE, ADS065BE, and ADS070BE. ADS red dyes include ADS067RE, ADS068RE, ADS069RE, ADS075RE, ADS076RE, ADS067RE, and ADS077RE.

In some embodiments, the additional luminescent material includes a green light emitting quantum dot (QD) material. The green light emitting QD material may include a group II-VI compound, a group III-V compound, a group IV-IV compound, a group IV compound, a group I-III-VI$_2$ compound, or a mixture thereof. Non-limiting examples of group II-VI compounds include CdSe, CdTe, CdS, ZnSe, ZnTe, ZnS, HgTe, HgS, HgSe, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, HgZnSTe, or combinations thereof. Group III-V compounds may be selected from the group consisting of GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, InAlPAs, and combinations thereof. Examples of group IV compounds include Si, Ge, SiC, and SiGe. Examples of group I-III-VI$_2$ chalcopyrite-type compounds include $CuInS_2$, $CuInSe_2$, $CuGaS_2$, $CuGaSe_2$, $AgInS_2$, $AgInSe_2$, $AgGaS_2$, $AgGaSe_2$ and combinations thereof.

QD materials for use as the additional luminescent material may be a core/shell QD, including a core, at least one shell coated on the core, and an outer coating including one or more ligands, preferably organic polymeric ligands. Exemplary materials for preparing core-shell QDs include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, MnS, MnSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$, and appropriate combinations of two or more such materials. Exemplary core-shell QDs include, but are not limited to, CdSe/ZnS, CdSe/CdS, CdSe/CdS/ZnS, CdSeZn/CdS/ZnS, CdSeZn/ZnS, InP/ZnS, PbSe/PbS, PbSe/PbS, CdTe/CdS, and CdTe/ZnS.

The QD materials typically include ligands conjugated to, cooperated with, associated with, or attached to their surface. In particular, the QDs may include a coating layer comprising ligands to protect the QDs from environmental conditions including elevated temperatures, high intensity light, external gasses, and moisture, control aggregation, and allow for dispersion of the QDs in the host binder material.

The ratio of each of the individual luminescent material, for example coated phosphor particles and the additional luminescent materials may vary depending on the characteristics of the desired light output. The relative proportions of individual luminescent materials in a lighting apparatus may be adjusted such that when their emissions are blended and employed in the lighting apparatus, there is produced visible light of predetermined x and y values on the CIE chromaticity diagram created by the International Commission on Illumination (CIE). In certain embodiments, the lighting apparatus emits white light. The exact identity and amount of each luminescent material for use in a lighting apparatus can be varied according to the needs of the end user.

The lighting apparatus and/or backlight apparatus may be used for general illumination and display applications. Examples include chromatic lamps, plasma screens, xenon excitation lamps, UV excitation marking systems, automotive headlamps, home and theatre projectors, laser pumped devices, point sensors, liquid crystal display backlight units, televisions, computer monitors, smartphones, tablet computers and other handheld devices that have a display including a semiconductor light source as described herein. The list of these applications is meant to be merely exemplary and not exhaustive.

EXAMPLES

A saturated solution composed of $K_2SiF_6$ dissolved in 49% HF was prepared by adding 4.2 g $K_2SiF_6$ per 100 ml 49% HF to form a suspension which was vacuum filtered to remove excess solids. Approximately 2 vol % 49% HF was added to the saturated solution, to form a nearly saturated solution.

Mn-doped potassium fluorosilicate phosphor, $K_2SiF_6$:$Mn^{4+}$ was synthesized according to a procedure described in the referenced U.S. Pat. No. 7,497,973 in a HF solution with a drying temperature of about 70 degrees Celsius. The amount of manganese present in $K_2SiF_6$:$Mn^{4+}$ phosphor powder was about 10 mol %.

Comparative Examples 1-4 (Un-Coated Phosphor Particles)

The saturated solution (160 ml) was added to $K_2SiF_6$:$Mn^{4+}$ phosphor powder (40 g) in a Nelgen bottle, and the resulting suspension was stirred for about 10 minutes. The yellow supernatant solution was decanted and the saturated solution (160 ml) was added to the Nelgen bottle and stirred for about 10 mins. This process of decanting and adding the saturation solution was repeated one more time. The product was vacuum filtered, rinsed with acetone, and then dried under vacuum.

Examples 1 and 2 (Coated Phosphor Particles)

The saturated solution (160 ml) was added to $K_2SiF_6$:$Mn^{4+}$ phosphor powder (40 g) in a Nelgen bottle, and the resulting suspension was stirred for about 10 minutes. The yellow supernatant solution was decanted and the saturated solution (160 ml) was added to the Nelgen bottle and stirred for about 10 mins. This process of decanting and adding the saturation solution was repeated one more time. A saturated solution of KF in 49% HF was added to the suspension at a rate of 1.5 ml/min followed by stirring for about 10 mins. The supernatant was almost colorless. The product was vacuum filtered, rinsed with acetone, and then dried under vacuum.

The samples prepared in Examples 1-4 and Comparative Examples 1-4 were examined using X-ray diffraction (XRD). XRD results showed that the manganese content of the coated particles of the samples of Examples 1-4 were comparatively lower than that of the uncoated particles of the Comparative Examples 1-4.

Stability Testing in HTHH Environment

The samples prepared in Examples 1-4 and Comparative Examples 1-4 were dispersed into silicone (Sylgard 184) to form corresponding slurries, and these slurries were used to make the corresponding tapes. Each slurry was prepared by mixing 0.5 g of each sample (prepared in Examples 1-4 and Comparative Examples 1-4) with 1.5 g of Sylguard 184. These slurries were tape cast followed by curing at 90 degrees Celsius for 35 min to obtain self-standing tapes.

The tapes were measured for quantum efficiency (QE) at excitation wavelength 450 nm by using a quantum efficiency measuring system. These tapes were then placed into a high temperature and high humidity (HTHH) chamber (80 degrees Celsius, 85% relative humidity). After exposure to HTHH environment for a duration of 48 hours, QEs of the tapes were again measured at excitation wavelength 450 nm. Table 2 shows percentage change in QEs (or drop in QE) of tapes prepared using samples of Examples 1-4 and Comparative Examples 1-4 on exposure to HTHH environment for 48 hours

TABLE 2

| | Percentage drop in QE on exposure to HTHH environment | |
|---|---|---|
| Samples | Comparative Examples | Examples |
| 1 | 0.041 | 0.037 |
| 2 | 0.038 | 0.034 |
| 3 | 0.04 | 0.036 |
| 4 | 0.044 | 0.04 |
| 5 | 0.043 | 0.035 |
| 6 | 0.071 | 0.059 |

Table 2 shows that the changes in QEs of the samples of Examples 1-4 were comparatively lower (≤half) than the changes in QEs of the samples of Comparative Examples 1-4 (having uncoated phosphor particles) after HTHH exposure for 48 hours. These results showed that the coated phosphor particles (samples of Examples 1-4) had comparatively higher stability in the HTHH environment than that of the uncoated phosphor particles of Comparative Examples 1-4.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A process for preparing a population of coated phosphor particles comprising:
   combining particles of a phosphor of formula I with a first solution comprising a compound of formula II to form a suspension; and
   combining a second solution comprising a source of $A^+$ ions with the suspension,
   $A_x[MF_y]:Mn^{4+}$ (I)
   $A_x[MF_y]$ (II)
   wherein
   A is Li, Na, K, Rb, Cs, or a combination thereof;
   M is Si, Ge, Sn, Ti, Zr, Al, Ga, In, Sc, Hf, Y, La, Nb, Ta, Bi, Gd, or a combination thereof;
   x is an absolute value of a charge of an $[MF_y]$ ion; and
   y is 5, 6, or 7.

2. The process according to claim 1, wherein
   A is Na, K, or a combination thereof; and
   M is Si, Ge, Ti, Zr, or a combination thereof.

3. The process according to claim 1, wherein the source of $A^+$ ions comprises a compound selected from a halide, sulphate, phosphate, acetate, and combinations thereof.

4. The process according to claim 3, wherein the source of $A^+$ ions comprises KF, $KHF_2$, KCl, KBr, KI, $K_2SO_4$, $K_3PO_4$, $CH_3COOK$, or a combination thereof.

5. The process according to claim 1, wherein the first solution, the second solution or both the first solution and the second solution comprises hydrofluoric acid.

6. The process according to claim 1, wherein the second solution is added to the suspension at a rate less than 100 milliliters/minute.

7. The process according to claim 1, wherein the second solution is added to the suspension at a rate in a range from about 0.1 millimeter/minute to about 10 milliliters/minute.

8. The process according to claim 1, wherein a molar ratio of the source of $A^+$ ions to the compound of formula II is in a range from about 1:1 to about 1:20.

9. The process according to claim 1, wherein the phosphor of formula I is $K_2SiF_6:Mn^{4+}$.

10. The process according to claim 1, wherein the compound of formula II is $K_2SiF_6$.

11. A process for preparing a population of coated phosphor particles comprising:
    combining particles of $K_2SiF_6:Mn^{4+}$ with a first solution comprising $K_2SiF_6$ to form a suspension; and
    combining a second solution comprising KF with the suspension.

12. The process according to claim 1, wherein each particle in the population of coated phosphor particles includes a core including a phosphor of formula I and a coating including a compound of formula II.

* * * * *